United States Patent
Jiang et al.

(10) Patent No.: US 7,791,791 B2
(45) Date of Patent: Sep. 7, 2010

(54) TRANSPARENT ELECTRO-OPTIC GAIN CERAMICS AND DEVICES

(75) Inventors: Hua Jiang, Sharon, MA (US); Yingyin Kevin Zou, Lexington, MA (US); Kewen Kevin Li, Andover, MA (US)

(73) Assignee: Boston Applied Technologies, Incorporated, Woburn, MA (US)

( * ) Notice: Subject to any disclaimer, the term of this patent is extended or adjusted under 35 U.S.C. 154(b) by 548 days.

(21) Appl. No.: 11/825,995

(22) Filed: Jul. 10, 2007

(65) Prior Publication Data

US 2008/0151358 A1 Jun. 26, 2008

Related U.S. Application Data

(63) Continuation-in-part of application No. 11/528,166, filed on Sep. 27, 2006, now abandoned.

(60) Provisional application No. 60/812,263, filed on Jun. 9, 2006.

(51) Int. Cl.
*H01S 3/00* (2006.01)
(52) U.S. Cl. .................. 359/333; 501/134; 385/141
(58) Field of Classification Search ............... 359/333; 501/134; 385/141; 252/62.9 R
See application file for complete search history.

(56) References Cited

U.S. PATENT DOCUMENTS

| | | | |
|---|---|---|---|
| 3,666,666 A | 5/1972 | Haertling | |
| 5,864,412 A | 1/1999 | Wilde | |
| 6,137,619 A | 10/2000 | Chen et al. | |
| 6,229,934 B1 | 5/2001 | Melman et al. | |
| 6,330,097 B1 | 12/2001 | Chen et al. | |
| 6,404,537 B1 | 6/2002 | Melman et al. | |
| 6,522,456 B2 | 2/2003 | Chen et al. | |
| 6,700,694 B2 | 3/2004 | Zou et al. | |
| 6,746,618 B2 * | 6/2004 | Li et al. | 252/62.9 R |
| 6,890,874 B1 * | 5/2005 | Li et al. | 501/134 |

(Continued)

OTHER PUBLICATIONS

A. Ikesue, et al., "Fabrication and optical characteristics of polycrystalline Nd:YAG ceramics for solid-state laser," Digest of CLEO/Pacific Rim'95., Jul. 10-14, 1995, p. 3.

(Continued)

*Primary Examiner*—Mark Hellner (57) ABSTRACT

The present invention provides a rare-earth ions doped, especially erbium and ytterbium doped transparent electro-optic gain ceramic material consisting lead, zirconium, titanium and lanthanum. The electro-optic gain ceramic material either has a linear electro-optic coefficient or a quadratic electro-optic coefficient, which is greater than about $0.3 \times 10^{-16}$ m$^2$/V$^2$ for the latter, a propagation loss of less than about 0.3 dB/mm, and an optical gain of great than 1.5 dB/mm at a wavelength of about 1550 nm while optically pumped by a 1.4 watts diode laser at a wavelength of 970 nm at 20° C. The present invention also provides electro-optic devices including a rare-earth ions doped, especially erbium and ytterbium doped, transparent electro-optic gain ceramic material consisting lead, zirconium, titanium and lanthanum. The present invention also provides lossless optical devices and amplifiers with an operating wavelength in the range of 1450 nm to 1700 nm while optically pumped at a wavelength in the range of 880 nm to 1020 nm. The materials and devices of the present invention are useful in light intensity, phase and polarization control at a wavelength of about 1550 nm.

9 Claims, 10 Drawing Sheets

U.S. PATENT DOCUMENTS

| | | | |
|---|---|---|---|
| 7,526,176 B2* | 4/2009 | Nashimoto et al. | 385/141 |
| 2003/0220184 A1* | 11/2003 | Li et al. | 501/134 |
| 2005/0090378 A1* | 4/2005 | Li et al. | 501/134 |

OTHER PUBLICATIONS

H. Park, et al., "Structure and dielectric properties of PLZT ceramics modified with lanthanide ions," J. Am. Ceram. Soc., vol. 82, No. 1, p. 94 (1999).

J. Ballato, et al., "Phonon sideband spectroscopy and 1550 nm luminescence from Eu3+ and Er3+ doped ferroelectric PLZT for active electro-optic applications,"J. Lumin., vol. 86, p. 101 (2000).

S. Murakami, et al., "Near-infrared luminescence and spectral anomaly in PLZT ceramics doped with Nd3+, Er3+, Yb3+ and Cr5+ ions at low temperatures", J. Lumin., vol. 87-89, p. 694 (2000).

A.S.S. de Camargo, et al.,"Structural and spectroscopic properties of rare-earth (Nd3+, Er3+, and Yb3+) doped transparent lead lanthanum zirconate titanate ceramics", J.Appl.Phys.,vol. 95, No. 4., p. 2135 (2004).

X. Chen, at al., "Novel Electro-Optic Ceramic Materials for Microchip and High Power Lasers," Mat. Res. Soc. Symp. Proc. vol. 782, p. A5.57.1 (2004).

J.W.Zhang, et al., "Optical Amplification in Nd3+ doped electro-optic lanthanum lead zirconate titanate ceramics," Appl. Phys. Lett., vol. 89, 061113 (2006).

* cited by examiner

TRANSPARENT ELECTRO-OPTIC GAIN CERAMICS AND DEVICES

CROSS REFERENCE TO RELATED APPLICATION

This is a continuation-in-part of U.S. patent application Ser. No. 11/528,166, filed on Sep. 27, 2006, now abandoned which claims the benefit of provisional application Ser. No. 60/812,263 filed on Jun. 9, 2006, the entire teachings of all of which are incorporated herein by this reference.

STATEMENT OF GOVERNMENTAL INTEREST

This invention was made with Government supports under grant no. DMI-0450547 awarded by National Science Foundation, and award no. DE-FG02-04ER83911 awarded by Department of Energy. The government has certain rights in this invention.

BACKGROUND OF THE INVENTION

1. Technical Field

The present invention relates to materials and devices with optical gains, and more particular an electro-optic material with high transparency and high optical gain and electro-optic activity and devices constructed using such materials.

2. Technical Background

While much progress has been made in the last thirty years in developing optical and fiber optical components, such as modulators, switches or lasers, current devices are not satisfactory for every application. Many active optical devices, such as intensity attenuators, used in present-day systems are based on electromechanical actuation. In one type of conventional device, optical fibers are positioned end to end and mechanically moved into or out of line. In another type of conventional device, mirrors are rotated to direct beams into or away from a receiving fiber. This can be accomplished mechanically, or with piezoelectric or electrostatic devices. Devices based on motion of components have slow switching times, and may have unacceptable environmental or long-term stability.

Optical devices without moving parts have been designed to address some of the switching speed and stability problems mentioned above. These devices depend on materials that can change optical properties without bulk motion, such as liquid crystalline materials and electro-optic crystal materials. Liquid crystals tend to have relatively slow switching speeds, as the mechanism of actuation is rotation of entire molecules under the influence of an electric field. Electro-optic crystal materials such as $LiNbO_3$ have much higher switching speeds, but are extremely polarization dependent.

One especially promising class of materials for use in active optical devices is electro-optic ceramic materials. Electro-optic ceramics are generally composed of ferroelectric complex oxides, and are polycrystalline. Due to the random orientations of the individual crystalline grains, electro-optic ceramics are optically isotropic in the absence of an electric field. In the presence of an electric field, electro-optic ceramic materials become anisotropic, with a lower refractive index in the direction of the field than perpendicular to the field. The material may be switched between isotropic and anisotropic states by controlling the electric field. For use in electro-optic applications, it is desirable that electro-optic ceramic materials have high transparency, high quadratic electro-optic coefficients and low switching hysteresis.

Lead lanthanum zirconate titanate (PLZT) is the most common electro-optic ceramic material. PLZT materials can be formed to be substantially transparent to light having wavelengths in the range of 0.5 µm to 7 µm. Properties of PLZT compositions can be tuned by adjusting the relative amounts of lead, lanthanum, zirconium and titanium. For example, a PLZT composition having the formula $Pb_{0.91}La_{0.09}(Zr_{0.65}Ti_{0.35})_{0.9775}O_3$ has a quadratic electro-optic coefficient $R=9.2\times10^{-16}\,m^2/V^2$, but has extremely large hysteresis at low fields, making it unsuitable for high-speed electro-optic applications. By increasing the lanthanum concentration, one can improve hysteresis at the expense of electro-optic activity. For example, a PLZT composition having the formula $Pb_{0.9025}La_{0.0975}(Zr_{0.65}Ti_{0.35})_{0.975625}O_3$ has a lower quadratic electro-optic coefficient ($R\sim2.5\times10^{-16}\,m^2/V^2$), but has temperature performance and hysteresis suitable for use in devices for optical telecommunications.

To compensate the optical loss of a light signal during transmission, optical signal amplifiers based on erbium doped optical glass fiber were used. It is very difficult to dope high concentration of rare earth ions (>1 at. %) into the glass fiber which limiting the pump absorption. Instead large amount of Er:fiber is needed to get the efficient amplification and laser output.

There are a few attempts to dope rare-earth elements into electro-optic PLZT ceramics and the structure, dielectric and spectroscopic properties were studied. Zhang et al. had demonstrated that $Nd^{3+}$ doped PLZT are highly transparent, with reasonable electro-optic effect and high optical gain (J. W. Zhang, et al., Optical amplification in $Nd^{3+}$ doped electro-optic lanthanum lead zirconate titanate ceramics). However, they failed to demonstrate if the rare-earth doped PLZT, such as erbium and ytterbium doped PLZT is still transparent. They also failed to demonstrate that the rare-earth doped PLZT still exhibit reasonable electro-optic effects, and most importantly, the optical gain.

Hence, a need exists in the art for a cost-effective high-transparent electro-optic gain ceramic materials that can be used for lossless optical devices, optical amplifiers, and ceramic laser with self Q-switching or mode-locking.

SUMMARY OF THE INVENTION

One aspect of the present invention relates to a rare-earth ion doped, transparent electro-optic gain ceramic material consisting lead (Pb), zirconium (Zr), titanium (Ti), and lanthanum (La).

Another aspect of the present invention relates to an erbium (Er) and Ytterbium (Yb) doped, transparent electro-optic gain ceramic material consisting lead (Pb), zirconium (Zr), titanium (Ti), and lanthanum (La) for telecommunication wavelengths.

Another aspect of the present invention relates an Er and Yb doped, transparent electro-optic gain ceramic material consisting lead, zirconium, titanium and lanthanum, wherein the electro-optic gain ceramic material has either a linear or a quadratic electro-optic coefficient, which could be greater than about $0.4\times10^{-16}\,m^2/V^2$ for the latter, a propagation loss of less than about 0.3 dB/mm, and an optical gain of great than 1.5 dB/mm at a wavelength of about 1550 nm while optically pumped by a 1.4 watts diode laser at a wavelength of 970 nm at 20° C.

Another aspect of the present invention relates an Er and Yb doped, transparent electro-optic gain ceramic material consisting lead, zirconium, titanium, and lanthanum, wherein the electro-optic gain material has either a linear or a quadratic electro-optic coefficient, which could be greater than about $0.4\times10^{-16}$ m$^2$/V$^2$ for the latter, a propagation loss of less than about 0.3 dB/mm, and an optical gain of great than 1.5 dB/mm at a wavelength of about 1550 nm while optically pumped by a 1.4 watts diode laser at a wavelength of 970 nm at 20° C., and wherein the electro-optic ceramic material has the formula $Pb_{1-x}La_z[Er_yYb_w(Zr_xTi_{1-x})_{1-3(y+w)/4-z/4}]O_3$ wherein x is between about 0.05 and about 0.95, y is between about 0.001 and about 0.05, z is between about 0 and about 0.15, and w is between 0 to 0.05. One especially preferred electro-optic gain ceramic materials of the present invention, x is between about 0.55 and about 0.85, y is between about 0.001 and about 0.03, z is between about 0.07 and 0.12, and w is between 0 to 0.05.

Another aspect of the invention is an electro-optic device including Er and Yb doped, lead, zirconium, titanium, and lanthanum-based electro-optic gain ceramic material.

Yet another aspect of the invention is a lossless electro-optic device or an optical amplifier including Er and Yb doped lead, zirconium, titanium, and lanthanum-based electro-optic gain ceramic.

The materials and devices of the present invention result in a number of advantages over conventional materials and devices. The materials of the present invention have high transparency over a wide wavelength range. The materials have significant quadratic electro-optic coefficients and high optical gains make it suitable for both electro-optic device and laser applications. One particular application of this Er and Yb doped electro-optical ceramic gain material is for a self Q-switched or mode-locked solid state laser. Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

DETAILED DESCRIPTION OF THE PREFERRED EMBODIMENTS

Rare-earth ions have been doped in crystal or glass materials for laser applications at different wavelength, such as $Nd^{3+}$ doped materials for 1064 nm, $Pr^{3+}$ doped materials for 630 nm, $Er^{3+}$ and $Yb^{3+}$ doped materials for 1550 nm, $Er^{3+}$ doped materials for 1550 nm and 2900 nm, $Yb^{3+}$ doped materials for 1030 nm, $Ho^{3+}$ and $Tm^{3+}$ doped materials for 1800 nm~2100 nm.

For rare-earth transitions to be viable for lasers, the phonon energy of the host material must be low to ensure that the transitions possess high quantum efficiencies for low-threshold operation. Also the host material must be transmissive to both the transition wavelengths as well as the pump wavelengths that are used to populate the upper states of the transitions. The PLZT materials as host materials for rare-earth ions meet both criteria mentioned above.

The present invention provides an electro-optic gain ceramic material with high transparency, good quadratic electro-optic coefficients, and high optical gain. The electro-optic gain ceramic materials of the present invention are rare earth ion doped, especially erbium ion ($Er^{3+}$) and ytterbium ion ($Yb^{3+}$) doped lanthanum-modified lead zirconate titanate (PLZT) ceramics having either a linear or a quadratic electro-optic coefficient, which could be greater than about $0.4\times10^{-16}$ m$^2$/V$^2$ for the latter, a propagation loss of less than about 0.3 dB/mm, and an optical gain of great than 1.5 dB/mm at a wavelength of about 1550 nm while optically pumped by a 1.4 watts diode laser at a wavelength of 970 nm at 20° C. The electro-optic gain ceramic materials of the present invention are useful in the fabrication of electro-optic devices such as optical amplifiers and ceramic lasers. It is also useful for various electro-optic devices such as modulators, switches, polarization controllers, and variable optical attenuators. These devices could be an optically lossless device under appropriate optical pumping.

Electro-optic materials are materials that change their birefringence in the presence of an electric field. The utility of an electro-optic material in an electro-optic device depends, in large part, on the magnitude of its electro-optic coefficients. The birefringence $\Delta n$ of an electro-optic material in the presence of an electric field can be described by the equation $$\Delta n = \Delta n_0 + \frac{n^3}{2}(\gamma \cdot E + R \cdot E^2)$$

where $\Delta n_0$ is the birefringence of the material in the absence of an electric field, n is the ordinary refractive index of the material, E is the magnitude of the applied electric field, $\gamma$ is the linear electro-optic coefficient, and R is the quadratic electro-optic coefficient. As the electro-optic gain ceramic materials of the present invention, a $Er^{3+}$ and $Yb^{3+}$ doped PLZT (Er—Yb:PLZT) electro-optic gain ceramic materials may exhibit either linear electro-optic coefficient $\gamma$ after electrical poling or quadratic electro-optic coefficients R, depending on the materials composition ratio. One example of the present invention is the Er—Yb:PLZT electro-optic gain ceramic material is isotropic under no external electric field, $\Delta n_0$ and $\gamma$ are essentially zero, making the electro-optic activity proportional to the quadratic electro-optic coefficient. The Er—Yb:PLZT electro-optic gain ceramic materials described herein as the example have quadratic electro-optic coefficients R greater than about $0.4 \times 10^{-16}$ m$^2$/V$^2$ at 20° C. and at a wavelength of 1550 nm.

While electro-optic activity is important, a material with high electro-optic activity will be rendered useless if it is not sufficiently transparent at the wavelength of interest. Transparency at wavelengths ranging from visible to infrared is an important feature of the electro-optic gain ceramic materials of the present invention. As will be described more fully below, the electro-optic ceramic gain materials of the present invention can be formed by the skilled artisan to be very dense and relatively free of scattering voids and undesired impurity phases. The electro-optic gain ceramic materials of the present invention have propagation losses of less than about 0.3 dB/mm.

In the present invention, the electro-optic gain ceramic material includes lead, zirconium, titanium, lanthanum, erbium and ytterbium. Preferred electro-optic gain ceramics of the present invention may be described by the general formula $$Pb_{1-z}La_z[Er_yYb_w(Zr_xTi_{1-x})_{1-3(y+w)/4-z/4}]O_3,$$

wherein x is between about 0.05 and about 0.95, y is between about 0 and about 0.05, z is between about 0 and about 0.15, and w is between 0 to 0.10. One especially preferred electro-optic gain ceramic materials of the present invention, x is between about 0.55 and about 0.85, y is between about 0.001 and about 0.03, z is between about 0.07 and 0.12, and w is between 0 to 0.05.

The relative amounts of individual atomic species may be described by a cation fraction. For example, though the titanium atom is part of the polyatomic titanium anion (TiO$_3^{2-}$) in the present compositions, the titanium atom itself has a +4 formal charge, and is thus considered herein to be a cation. The cation fraction of a particular atomic species is the ratio of the number of atoms of the particular atomic species to the total number of cationic atoms. For example, for the electro-optic gain ceramic material $$Pb_{0.9}La_{0.1}[Er_{0.02}Yb_{0.05}(Zr_{0.65}Ti_{0.35})_{0.9225}]O_3,$$

the cation fractions may be calculated as follows:

Lead cation fraction=0.9/{0.9+0.1+[0.02+0.05+(0.65+0.35)·0.9225]}=0.452

Lanthanum cation fraction=0.1/{0.9+0.1+[0.02+0.05+(0.65+0.35)·0.9225]}=0.050

Erbium cation fraction=0.02/{0.9+0.1+[0.02+0.05+(0.65+0.35)·0.9225]}=0.010

Ytterbium cation fraction=0.05/{0.9+0.1+[0.02+0.05+(0.65+0.35)·0.9225]}=0.025

Zirconium cation fraction=(0.65·0.9225)/{0.9+0.1+[0.02+0.05+(0.65+0.35)·0.9225]}=0.301

Titanium cation fraction=(0.35·0.9225)/{0.9+0.1+[0.02+0.05+(0.65+0.35)·0.9225]}=0.162

The electro-optic gain ceramic materials of the present invention may be made by methods familiar to the skilled artisan. A wide variety of inorganic compounds may be used as the starting materials. For example, oxides, hydroxides, carbonates, sulfates, acetates or alkoxides of the desired metals may be used to form the ceramics of the present invention. In general, an opaque powder having the desired ceramic stoichiometry is first prepared and dried. For example, the mixed oxide method has been used to fabricate powders of the materials of the present invention, as described below in Example 1. Other methods, such as chemical co-precipitation and other more advanced techniques, may be used to prepare the powder. Before being densified, the powder may optionally be formed into an opaque powder preform by, for example, cold pressing.

The opaque powder or powder preform may then be densified by methods familiar to the skilled artisan to form the ceramic materials of the present invention. For example, a powder preform may be hot-pressed to form a dense, transparent, perovskite-structured ceramic as described below in Example 1. Important processing parameters such as hot-pressing temperature, applied pressure, ambient conditions and processing time may be determined by the skilled artisan. Other densification techniques, such as vacuum sintering, isostatic pressing, hot isostatic pressing, or other pressing or sintering methods may be used by the skilled artisan to form the transparent ceramics of the present invention.

The electro-optic gain ceramic materials of the present invention are useful in the construction of electro-optic devices. Another aspect of the invention is an electro-optic device including an erbium and ytterbium doped lead, zirconium, titanium and lanthanum-based electro-optic gain ceramic material. The electro-optic device may work at a wavelength in the range of 500 nm to 2600 nm. The electro-optic gain material used in the device may have a quadratic electro-optic coefficient of greater than about $0.4 \times 10^{-16}$ m$^2$/V$^2$, a propagation loss of less than about 0.3 dB/mm, and an optical gain of great than 1.5 dB/mm at 20° C. at a wavelength of 1550 nm. The electro-optic ceramic gain material used in the device may have the compositions described hereinabove. The electro-optic gain ceramic material has the general formula $Pb_{1-z}La_z[Er_yYb_w(Zr_xTi_{1-x})_{1-3(y+w)/4-z/4}]O_3$.  wherein x is between about 0.05 and about 0.95, y is between about 0 and about 0.05, z is between about 0 and about 0.15, and w is between 0 to 0.10. One especially preferred electro-optic gain ceramic materials of the present invention, x is between about 0.55 and about 0.85, y is between about 0.001 and about 0.03, z is between about 0.07 and 0.12, and w is between 0 to 0.05.

An electro-optic device of the present invention may be, for example, an intensity modulator, a phase modulator, a switch, a phase retarder, a polarization controller, or a variable optical attenuator. Exemplary electro-optic devices that may be constructed using the electro-optic gain ceramic material of the present invention are described in U.S. Pat. Nos. 6,137,619, 6,330,097, 6,404,537, 6,522,456, and 6,700,694. Electro-optic devices of the present invention may be constructed in accordance with known techniques for making devices based on other electro-optic materials, such as PLZT.

Yet another aspect of the present invention relates to an optical lossless device or a light amplifier using an erbium and ytterbium doped electro-optic gain ceramic material including lead, zirconium, titanium, and lanthanum. The operating wavelength is in the range of 1450 nm to 1700 nm for telecommunication application.

The invention will be further clarified by the following non-limiting examples which are intended to be exemplary of the invention.

Example 1

An electro-optic gain ceramic material having the formula $Pb_{0.90}La_{0.10}[Er_{0.005}Yb_{0.025}(Zr_{0.65}Ti_{0.35})_{0.95}]O_3$ was prepared using the mixed oxide method as follows:

Lead (II) oxide (184.9 g), lanthanum (III) oxide (15.1 g), Erbium (III) oxide (0.9 g), Ytterbium (III) oxide (4.5 g), Zirconium (IV) oxide (70.2 g), and titanium (IV) oxide (24.5 g) powders were used as starting materials. A slight excess (about 2 wt %) of lead (II) oxide was added to counteract the effects of evaporation of lead during processing. These oxide powders were mixed with 275 ml water to form a slurry. The slurry was ball milled using 1500 g alumina cylinders in a 1500 ml jar for about 30 minutes, dried at 90° C. to completely remove the water, then fired at 900° C. for 1 hour. The fired powder was then ball milled with 275 mL organic solvent (e.g. trichloroethylene or acetone) in a 1500 mL plastic jar with 1500 g alumina cylinders. A one hour post annealing may be used to remove the residual organic left in the powder. An opaque cylindrical powder preform (5.1 cm long, 3.2 cm diameter) was formed by pressing the resulting powder in a stainless steel mold at a cold pressure of 140 kgf/cm² (about 2000 psi, or about 13.79 MPa).

Figure 1:
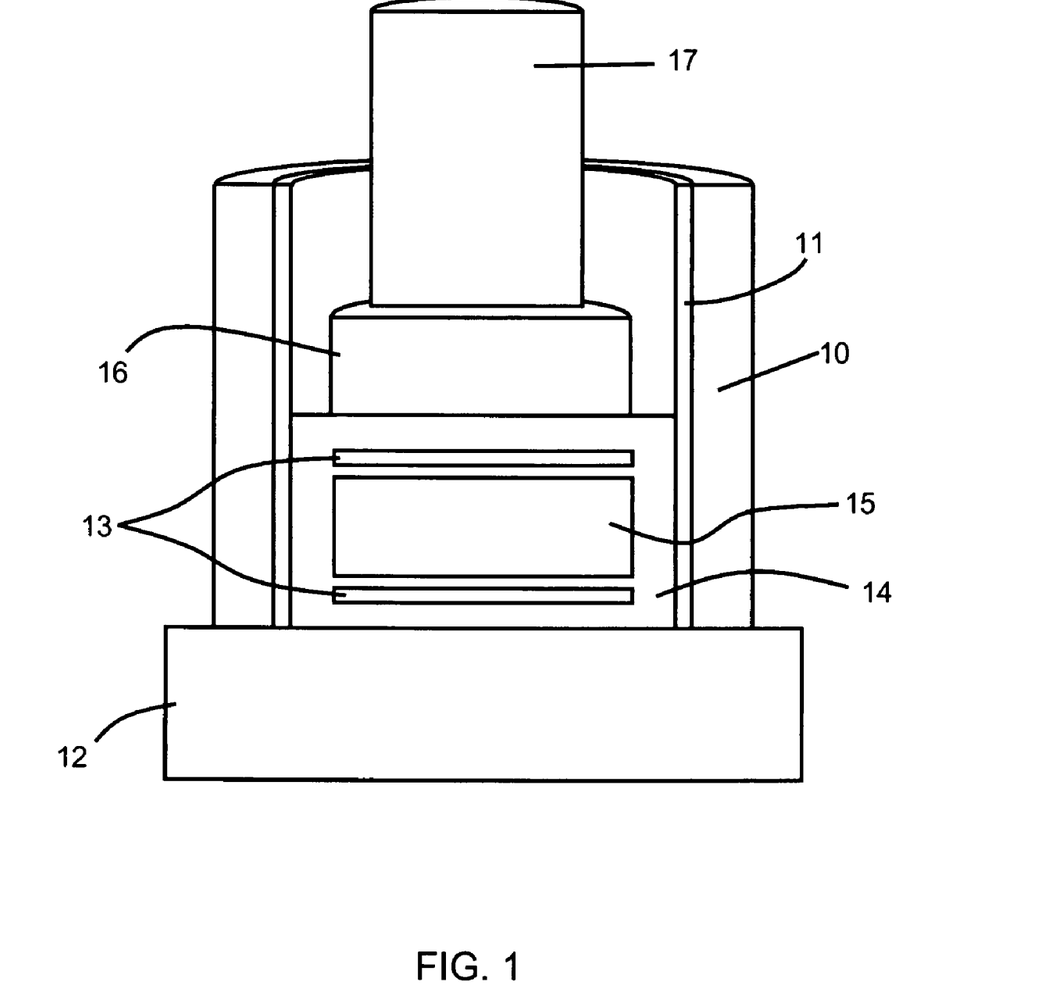
FIG. 1 is a schematic diagram of a hot pressing setup used to fabricate the electro-optic gain ceramics of the present invention.

The powder preform 15 was loaded into a cylindrical silicon carbide mold 10 lined with a high purity alumina tube 11, as shown in FIG. 1. The silicon carbide mold had an inner diameter of 4.5 cm, and sat on an alumina pedestal 12. Two zirconia discs 13 and high purity magnesium oxide powder 14 were used to isolate the preform from the mold, the pedestal, and from the 4.5 cm diameter alumina top press rod 16. The whole assembly was mounted in a hot press machine, with the alumina top press rod being coupled to the push rod 17 of a ten ton hot press from Thermal Technology Inc, of Santa Rosa, Calif. The chamber of the hot press machine was evacuated down to about 300 mTorr (40 Pa), and the temperature in the chamber was heated at a rate of about 5° C./min. When the temperature reached 650° C., oxygen was admitted to the chamber at a pressure of 3 psi (20.69 kPa). This pressure of oxygen was maintained throughout the remainder of the process. When the temperature reached 750° C., the press rod was actuated to press the preform at a pressure of 2000 psi (13.793 MPa). The preform was pressed at 1250° C. for 16 hours. The pressed slug was allowed to cool to room temperature in the press at a negligible pressure, removed from the mold, sliced and polished.

Example 2

The electro-optic ceramic materials having the formula $Pb_{1-z}La_z[Er_yYb_w(Zr_xTi_{1-x})_{1-3(y+w)/4-z/4}]O_3$ were prepared by the method of Example 1. These materials exhibited acceptable transparency for use in devices for optical telecommunications. Some examples are shown in Table 1.

TABLE 1

| Example | w | x | y | z |
|---|---|---|---|---|
| 2a | 0 | 0.65 | 0.005 | 0.10 |
| 2b | 0 | 0.65 | 0.02 | 0.10 |
| 2c | 0.025 | 0.65 | 0 | 0.10 |
| 2d | 0.025 | 0.65 | 0.005 | 0.10 |
| 2e | 0.025 | 0.65 | 0.01 | 0.10 |
| 2f | 0.025 | 0.65 | 0.02 | 0.10 |
| 2g | 0.025 | 0.65 | 0.03 | 0.10 |
| 2h | 0.05 | 0.65 | 0 | 0.10 |
| 2i | 0.05 | 0.65 | 0.005 | 0.10 |
| 2j | 0.05 | 0.65 | 0.02 | 0.10 |
| 2k | 0.05 | 0.65 | 0.03 | 0.10 |
| 2l | 0.06 | 0.65 | 0 | 0.10 |
| 2m | 0.08 | 0.65 | 0 | 0.10 |
| 2n | 0.10 | 0.65 | 0 | 0.10 |

Figure 2:
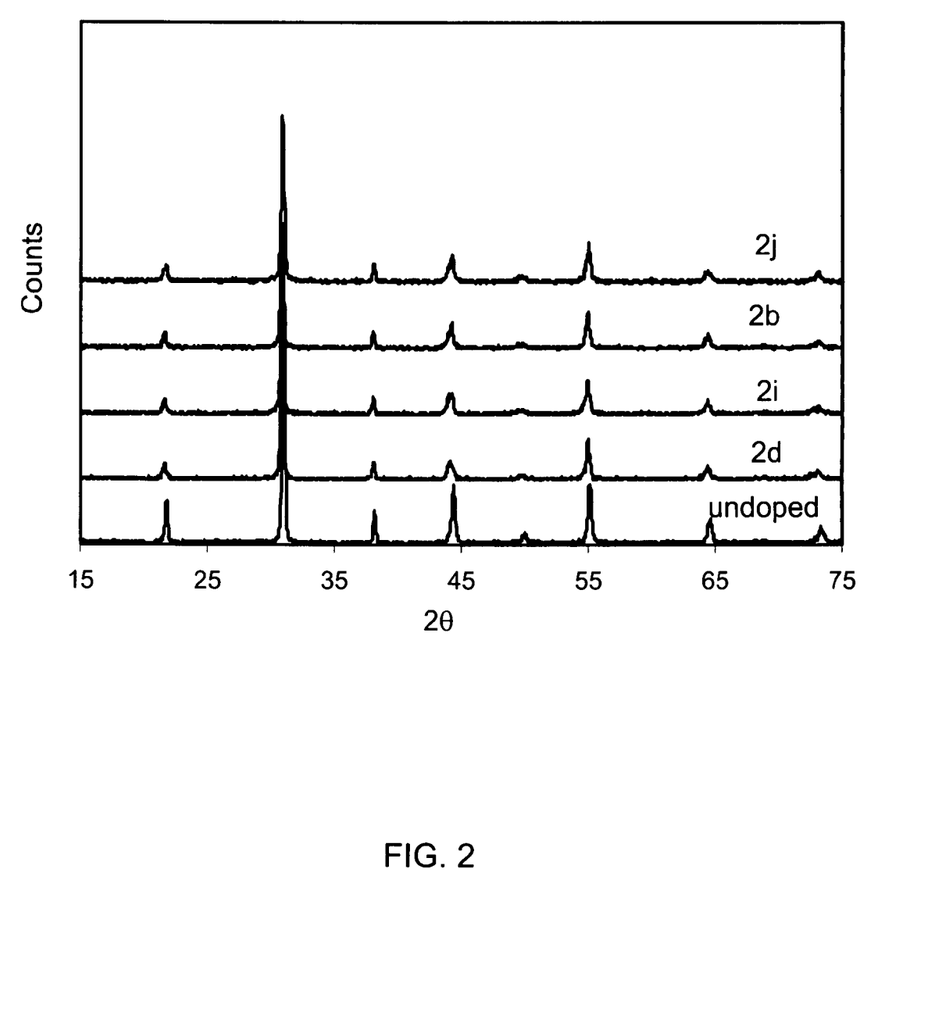
FIG. 2 is x-ray diffraction spectra of electro-optic gain ceramic materials of the present invention.

X-ray diffraction patterns are measured for Examples 2b, 2d, 2i and 2j as well as an un-doped PLZT, respectively, using a Rigaku diffractometer with $CuK_\alpha$ radiation in the 2θ range of 15° to 75° as shown in FIG. 2. The X-ray diffraction patterns show that all these hot-pressed ceramics have almost cubic symmetries and that the patterns can be indexed as cubic phases, which display a predominantly single phase material with pseudo-cubic perovskite structure. There is no trace of secondary phase, which usually can be addressed to oxide compounds of the raw materials segregated at the grain boundaries.

Example 3

Figure 3:
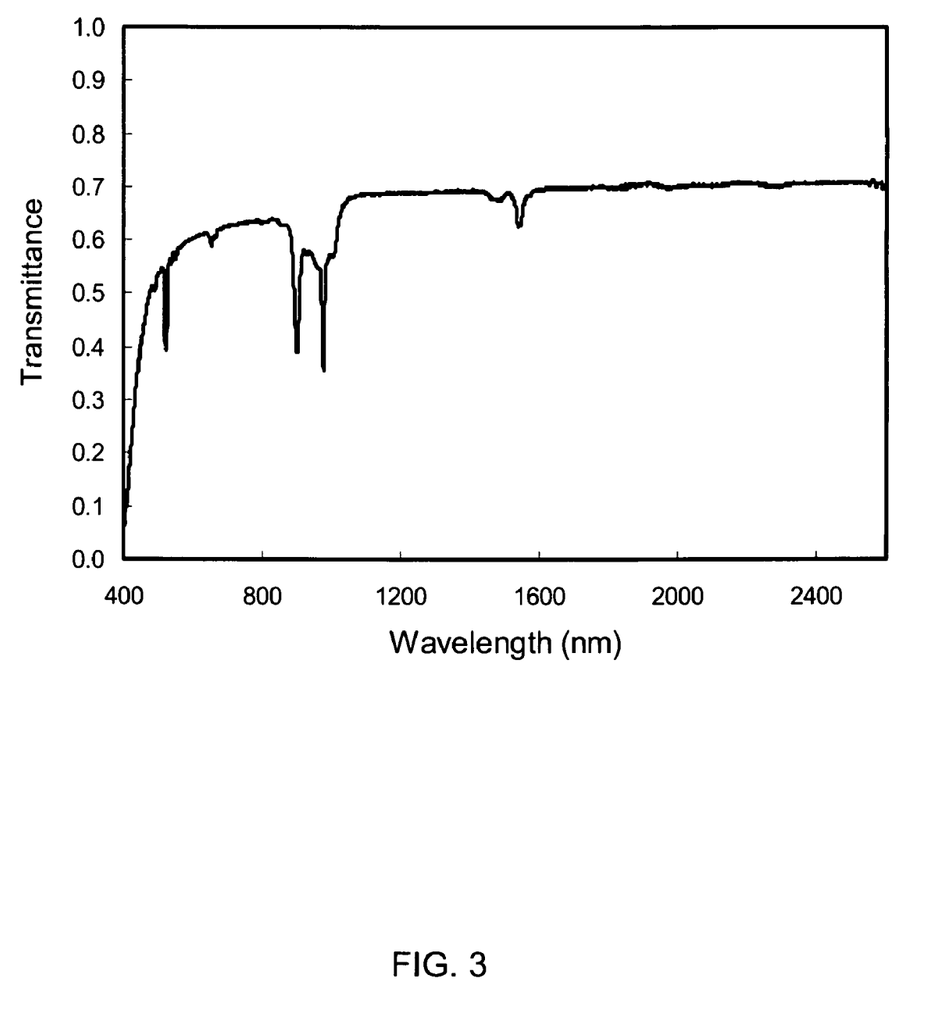
FIG. 3 is a transmission spectrum of an electro-optic gain ceramic material of an electro-optic gain ceramic material of the present invention.

FIG. 3 shows a transmission spectrum from about 400 nm to about 2600 nm of a polished, uncoated 2 mm thick slice of the electro-optic gain ceramic material Example 2i. The transmittance of the sample is above 70% over a wavelength range from about 1000 nm to 2600 nm except the wavelength located around 1550 nm where optical gain or lasing would be occur under external excitation. The propagation loss of the material may be calculated from the transmittance using the equation $$\% T = \left[1 - \left(\frac{n-1}{n+1}\right)^2\right] \cdot 10^{-0.1 \cdot [Propagation\ Loss\ (dB/mm)] \cdot [Path\ Length\ (mm)]}$$

Since at 1550 nm, the refractive index of these materials is about 2.3, the propagation loss is less than 0.3 dB/mm. The transparency of the ceramics of the present invention is comparable to the transparency of conventional PLZT materials.

Example 4

Figure 4:
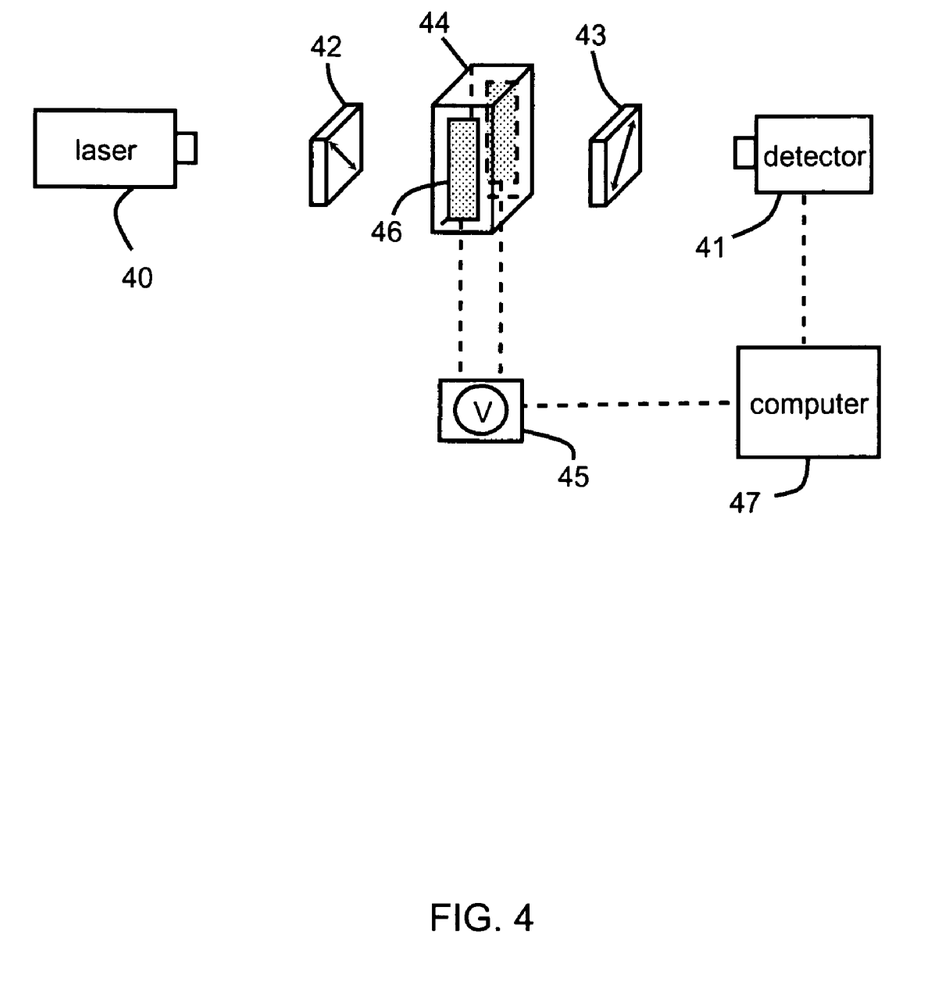
FIG. 4 is a schematic diagram of an experimental setup used to measure electro-optic coefficients.

The quadratic electro-optic constants of samples from Example 2 were measured using the experimental setup shown in FIG. 4. Light from a laser 40 passed through an input polarizer 42. Electrodes 46 are deposited on opposite faces of a polished sample 44 in order to allow the application of an electric field through the sample by a power source 45. The sample is placed in the light path with the direction of the applied electric field perpendicular to the direction of the light path and at a 45° angle to the polarization of the beam. After emerging from the sample the light is passed through an output polarizer 43 having its polarization axis set to be perpendicular to the polarization axis of the input polarizer 42. Light emerging from the output polarizer 43 is detected by a photodetector 41. A computer 47 is used to control the applied electric field, and to collect the measurement data. When the system is integrated with a function generator and an oscilloscope (not shown) by the skilled artisan, it may be used for measurement of response speed.

When no electric field is applied, the sample 44 has no effect on the polarization of the beam; therefore, no light makes it to the detector due to the action of the crossed polarizers 42 and 43. As the applied electric field increases, the sample becomes birefringent due to the electro-optic effect, and rotates the polarization of the beam. At a voltage $V_\pi$, the polarization of the beam is rotated by the sample enough to be parallel to the polarization axis of the second polarizer 43, maximizing the intensity of the detected signal. Assuming the material's native birefringence ($\Delta n_0$) and linear electro-optic coefficient $\gamma$ are zero, the quadratic electro-optic coefficient R may be calculated from the equation $$R = \frac{d^2 \lambda}{V_\pi^2 n^3 L}$$

where d is the distance between electrodes (i.e. the width of the sample), n is the refractive index of the sample at the wavelength $\lambda$, and L is the path length of the beam in the sample.

Figure 5:
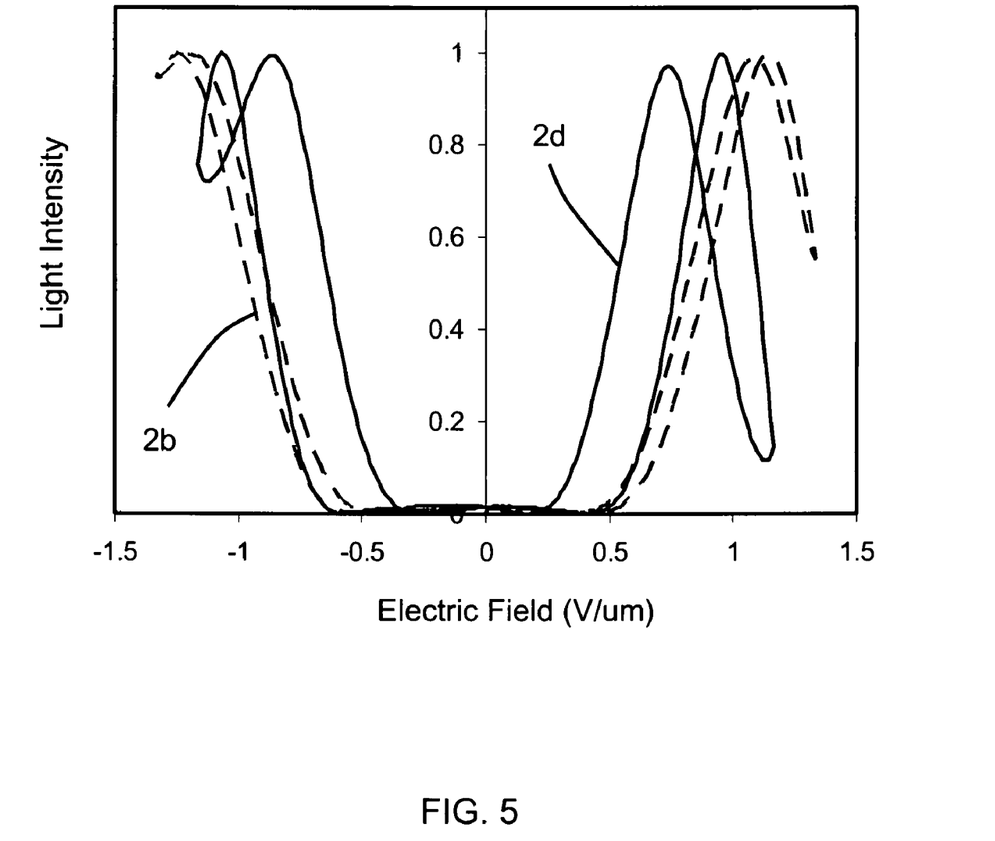
FIG. 5 is electro-optic phase retardation measurement results of electro-optic gain ceramic materials of the present invention.

Samples were cut from a 1.44 mm thick wafer polished on both sides. The samples had a width of 0.5 mm and a height of 2.5 mm. The parallel side surfaces of each sample were polished, plasma etched for 3 min, then coated with Pt/Au electrodes (250 Å/2500 Å). The electric field induced phase retardation of sample 2b and 2d were illustrated in FIG. 5. Quadratic EO coefficients of $0.44 \times 10^{-16}$ m$^2$/V$^2$ and $0.59 \times 10^{-16}$ m$^2$/V$^2$ were obtained for the sample 2b and 2d, respectively.

Example 5

Figure 6:
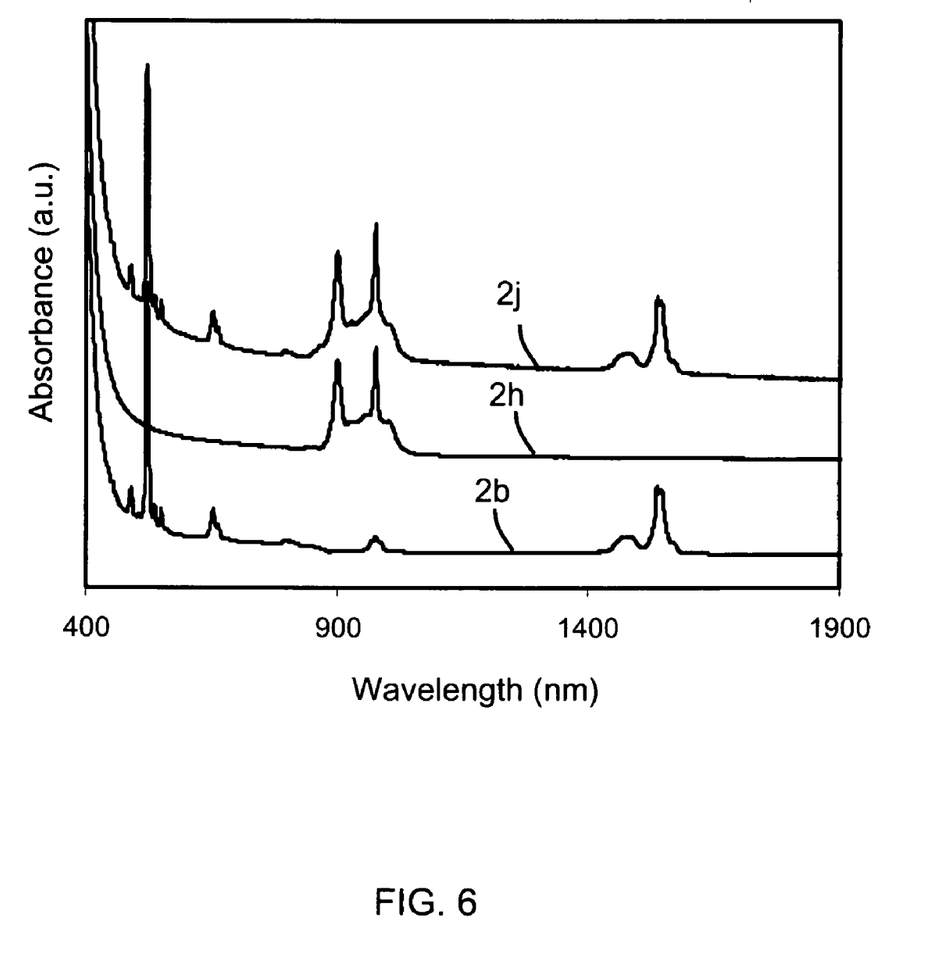
FIG. 6 is absorption spectra of electro-optic gain ceramic materials of the present invention.

The room temperature ground state absorbance of samples 2b (2% Er doping), 2h (5% Yb doping) and 2j (2% Er and 5% Yb co-doping) from Example 2 were measured in spectral region of 400-1700 nm by a UV-VIS-NIR spectrophotometer (Perkin-Elmer, Lamda 9). A number of absorption lines of sample 2b, which is only doped with $E^{3+}$, are observed and assigned as transitions from the $Er^{3+}$ ground state $^4I_{15/2}$ to different excited states, namely $^4I_{13/2}$ (1548 nm), $^4I_{11/2}$ (980 nm), $^2I_{9/2}$ (800 nm), $^4I_{9/2}$ (655 nm) and $^4I_{3/2}$ (550 nm), as shown in FIG. 6, curve 2b. For the $Yb^{3+}$-only doped sample 2h, there are only two absorption peaks located near 900 nm and 980 nm, both are from $Yb^{3+}$ ground state $^2F_{7/2}$ to excited states $^2F_{5/2}$, as illustrated in FIG. 6, curve 2h. For the $Er^{3+}$ and $Yb^{3+}$ co-doped sample 2j, the absorption peaks from both $Er^{3+}$ and $Yb^{3+}$ were observed, as shown in FIG. 6, curve 2j. Very strong absorption peaks around 980 nm of Yb doped samples were observed which are very critical for amplifier and laser application using commercial available semiconductor pumping laser with a wavelength of about 970 nm.

Figure 7:
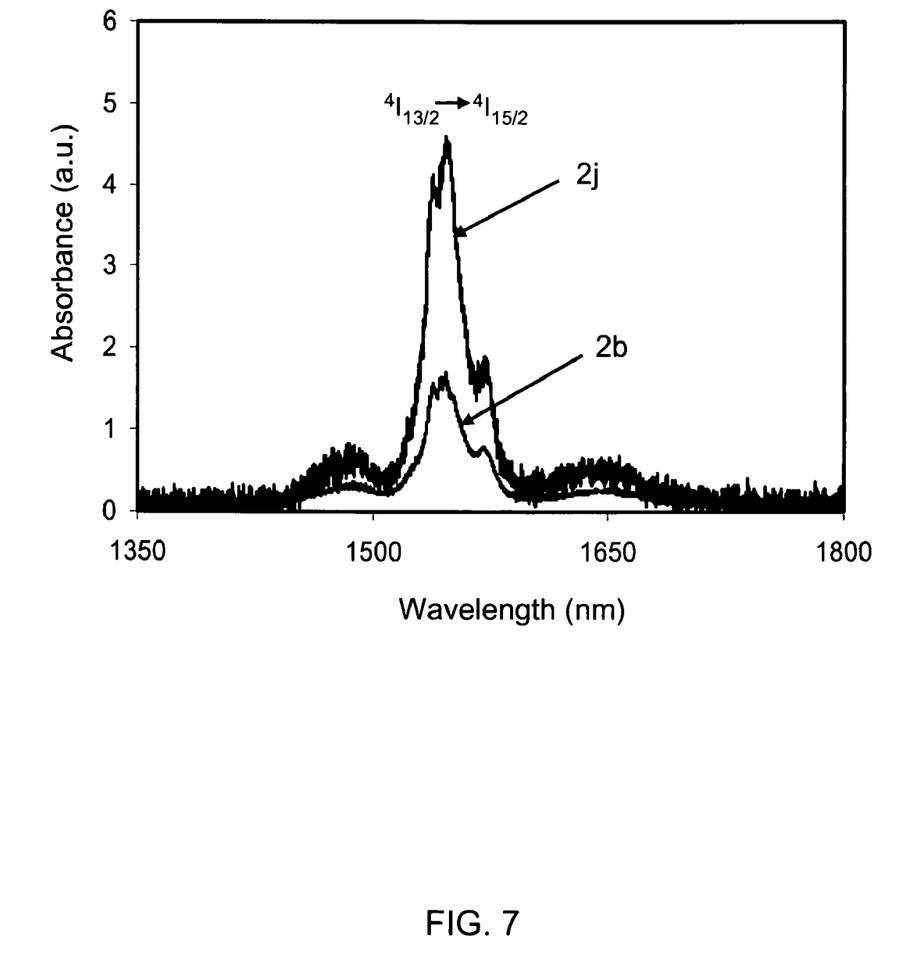
FIG. 7 is a photoluminescence spectrum of electro-optic gain ceramic materials of the present invention.

The room temperature photoluminescence (PL) of sample 2b and 2j of Example 2 was measured using a 970 nm CW diode laser as the excitation source. An appropriate long-pass filter (Corion filters, LL-850-F) was used between the sample and the monochorometer entrance to prevent scattering of the pump laser light from getting into the monochorometer (McPherson, model 78A-3). Photoluminescence from the sample was modulated with a chopper at a frequency of 250 Hz before entering the entrance slit (slit width is 600 μm). A PbS detector was used at the exit of the monochromator to convert the photoluminescence signal to electrical signal. An emission peak around 1550 nm was observed that corresponded to the $^4I_{13/2} \rightarrow ^4I_{15/2}$ transition, as illustrated in FIG. 7.

It demonstrated that co-doping Yb ions (curve 2j in FIG. 6) is an effective way to increase significantly the absorption strength at about 970 nm. The sample with 2% Er ion doping (curve 2b in FIG. 6) absorbed much less at this wavelength. $Yb^{3+}$ ions can increase $Er^{3+}$ ion's photoluminescence at wavelength of about 1550 nm when pumped under a diode laser at a wavelength of about 970 nm, which was confirmed as illustrated in FIG. 7. The 1550 nm photoluminescence of 5% Yb and 2% Er co-doping has doubled comparing to that of an only 2% Er doped sample. The $Yb^{3+}$ ions obviously help absorb the 970 nm pump energy by jumping to its only excited state $^4F_{5/2}$ that is very close to the 970 nm photon energy. Then the absorbed pump energy by $Yb^{3+}$ is transferred effectively to erbium ion's $^4I_{11/2}$ state, which is very close to ytterbium ion's $^2F_{5/2}$ level, leading to efficient 1550 nm PL from the $Er^{3+}$ ions due to the $^4I_{13/2} \rightarrow ^4I_{15/2}$ transition.

Example 6

Figure 8:
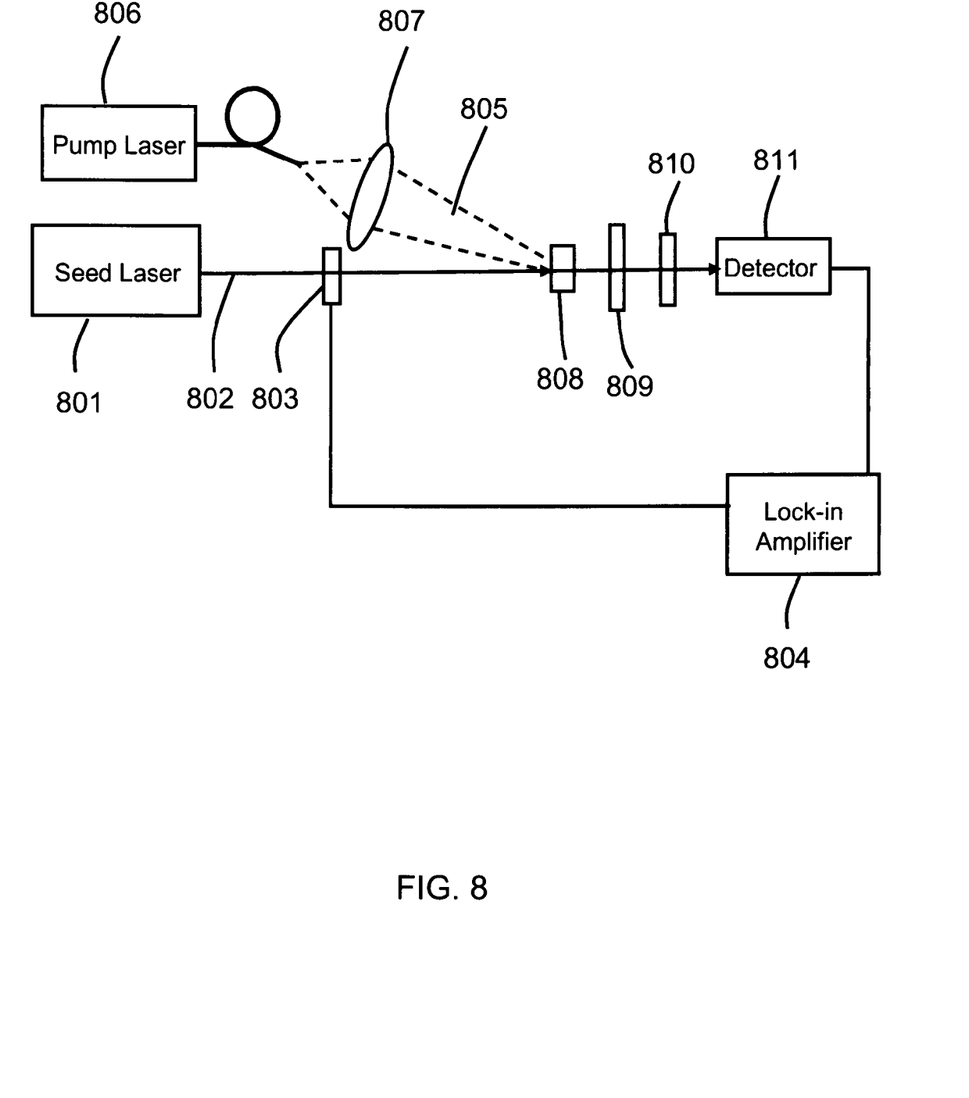
FIG. 8 is a schematic diagram of an experimental setup used to measure optical gain.

A configuration resembling to a traditional two-wave mixing geometry was chosen in our single-pass gain measurements, as shown on FIG. 8. A tunable laser 801 (Photonics, TUNICS PRI/PR 1550) was used as a seed laser source in which the wavelength was tuned at a center wavelength of 1550 nm. The seed laser beam 802 was coupled out from the tunable laser and collimated by a collimator (not shown here), and then modulated by a chopper 803 to be detected by a detector 811 and a lock-in amplifier 804. A fiber-pigtailed and TE-cooled laser diode 806 with 970 nm center wavelength, followed by a focus lens 807 to control the size of pump beam 805 for mode matching, was used to pump an erbium and ytterbium doped PLZT sample 808. A pinhole 809 and a long pass (>1 μm) filter 810 were used to block the pumping power to enter into the detector 811. Observable single-pass gains were obtained.

Figure 9:
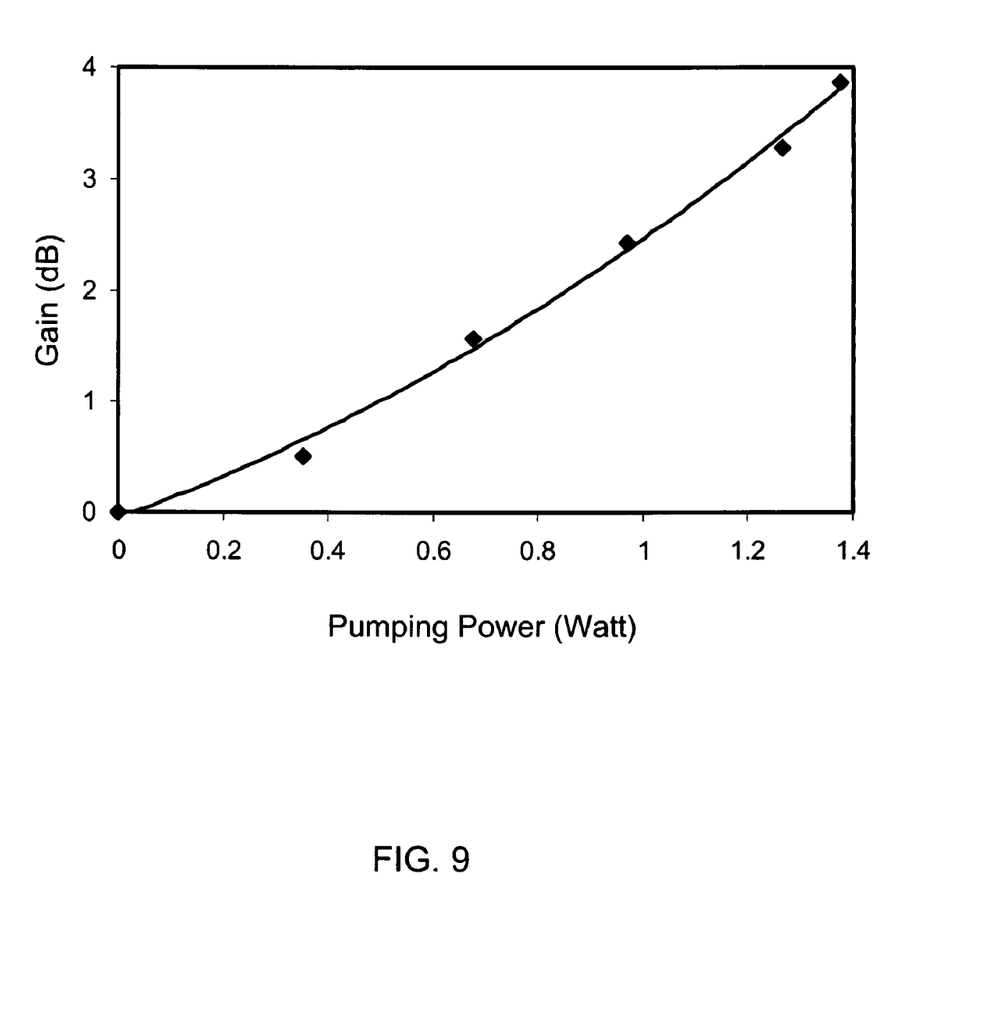
FIG. 9 is optical gain measurement results of an electro-optic gain ceramic material of the present invention.

Very high single-pass gains have been obtained in samples from Example 2. For a fixed seed power 190 μW with 1.0 mm diameter of the seed laser beam, the gains as a function of pumping power for a sample 2b from Example 2 were shown in FIG. 9. An optical gain of great than 1.5 dB/mm was achieved with a material about 2 millimeter long at a wavelength of about 1550 nm while optically pumped by a 1.38 watts diode laser at a wavelength of 970 nm at 20° C. As indicated in FIG. 6 and FIG. 7, both the absorption spectrum and photoluminescence spectrum of the Er and Yb doped PLZT are very broad, a pumping diode with a wavelength in the range of 970 nm to 982 nm can be used and an optical signal with a wavelength in the range of 1450 nm to 1700 nm can be amplified. The optical propagation loss is in the ranged of 0.3 dB/mm to 0.15 dB/mm.

Example 7

Electro-optic device can be configured which includes an erbium and ytterbium doped, lead, zirconium, titanium and lanthanum-based electro-optic gain ceramic material. The electro-optic gain ceramic material in present invention is transparent at least from 500 nm to 2600 nm. Various electro-optic devices can be constructed using this material. Some examples are a light modulator, a light polarization transformer/controller, an optical filter, an optical switches and an optical retarder.

Figure 10:
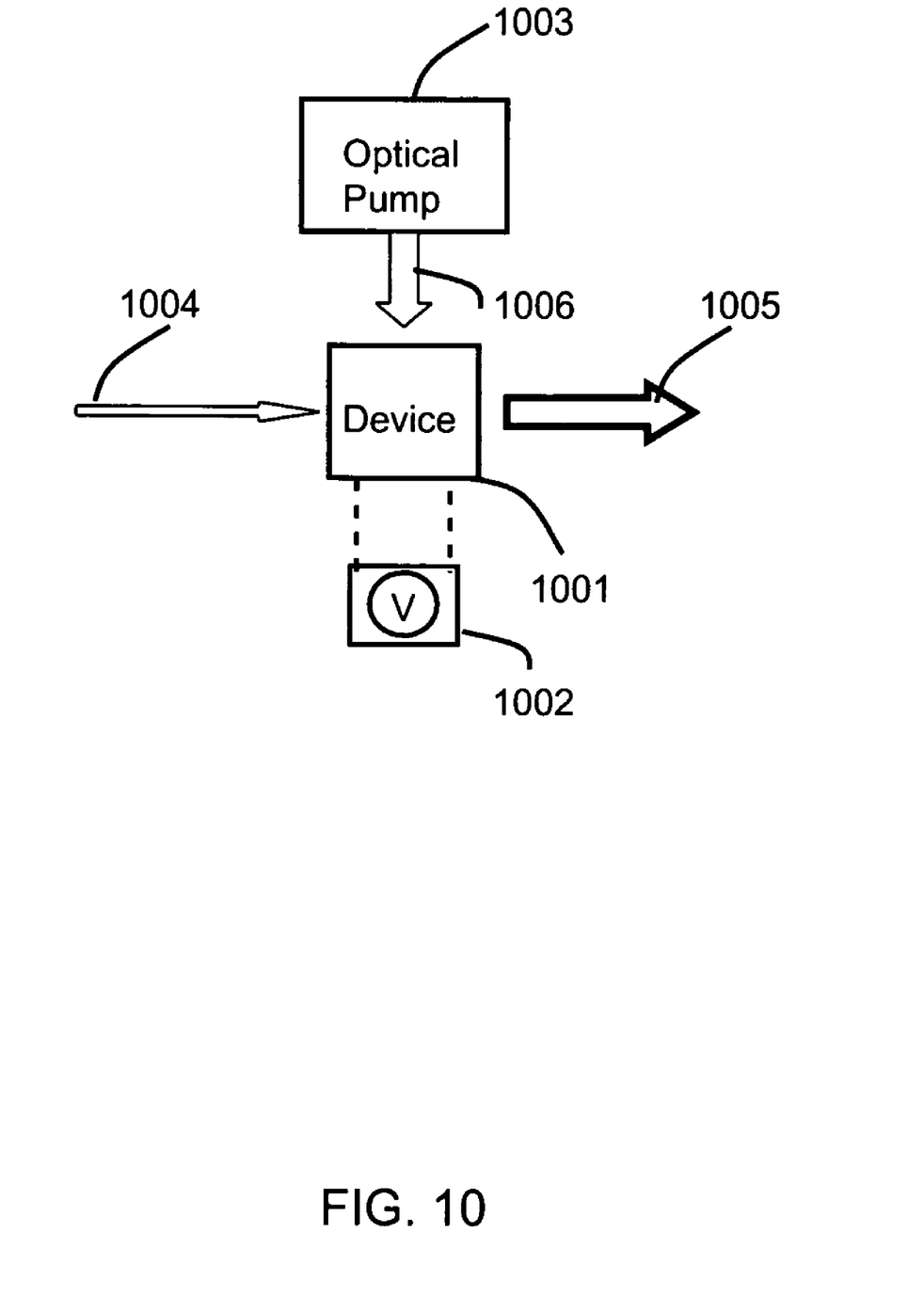
FIG. 10 is an embodiment of the present invention of a lossless electro-optic device using electro-optic gain ceramic materials.

Since the electro-optic gain ceramic materials have net optical gain under optical pumping, a lossless electro-optic device or an optical amplifier can be constructed. Illustrated in FIG. 10 is an embodiment of the invention of a lossless electro-optic device. An electro-optic device 1001 based on electro-optic gain ceramic material was controlled by a voltage control circuit 1002. It will manipulate the properties of the input light signal 1004 to form the output light signal 1005, which will result different optic devices, for example, an intensity modulator, a phase modulator, a switch, a phase retarder, a polarization controller, or a variable optical attenuator. The device is inherited with optical loss. By illuminate the electro-optic gain ceramic material with an optical pumping signal 1003, which can be a laser, a flash light or other optical mean, optical signal gain will occurred in device 1001 to compensate the optical loss of the device. Hence the lossless optical device can be achieved. When an optical gain is greater than the loss, optical signal amplification can be achieved.

The wavelength of the optical pumping source can range from 880 nm to 1020 nm as illustrated in FIG. 6 The device is preferred working at a wavelength in the range of 1450 nm to 1700 nm, for both a lossless device and an optical amplifier.

It will be apparent to those skilled in the art that various modifications and variations can be made to the present invention without departing from the spirit and scope of the invention. For example, Er doped PLZT gain ceramics laser system could be lasing at a center wavelength at 2.9 Mm using $^4I_{11/2} \rightarrow {}^4I_{13/2}$ energy transitions; or at a center wavelength at 4.75 µm using $^4I_{9/2} \rightarrow {}^4I_{11/2}$ energy transitions.

Because of the large pure optical gain exists in Er and Yb doped PLZT electro-optical gain ceramic materials, solid state laser can be realized for those skilled in the art. One particular application of this Er and Yb doped electro-optical ceramic gain material is for a self Q-switched or mode-locked solid state laser.

Other rare earth dopants can also be introduced in the system. For example, Ho and Tm can be doped into the materials to have an EO ceramic gain materials for devices working at a wavelength in the range of 1.8 micron to 2.1 micron. Thus, it is intended that the present invention covers the modifications and variations of this invention provided they come within the scope of the appended claims and their equivalents.

What is claimed is:

1. A transparent electro-optic gain ceramic material comprising
   lead,
   zirconium,
   titanium,
   lanthanum,
   erbium, and
   ytterbium,
   wherein the transparent electro-optic gain ceramic material has a formula $$Pb_{1-z}La_z[Er_yYb_w(Zr_xTi_{1-x})_{1-3(y+w)/4-z/4}]O_3$$

wherein
   x is between about 0.05 and about 0.95,
   y is between about 0 and about 0.05,
   z is between about 0 and about 0.15, and
   w is between 0 to 0.10.

2. The transparent electro-optic gain ceramic material of claim 1 wherein x is between about 0.55 and about 0.85.

3. The transparent electro-optic gain ceramic material of claim 1 wherein y is between about 0.001 and about 0.03.

4. The transparent electro-optic gain ceramic material of claim 1 wherein z is between about 0.07 and about 0.12.

5. The transparent electro-optic gain ceramic material of claim 1 wherein w is between about 0 and about 0.05.

6. An electro-optic device comprising a transparent electro-optic gain ceramic material including lead,
   zirconium,
   titanium,
   lanthanum,
   erbium, and
   ytterbium,
   wherein the transparent electro-optic gain ceramic material comprises the formula $$Pb_{1-z}La_z[Er_yYb_w(Zr_xTi_{1-x})_{1-3(y+w)/4-z/4}]O_3$$

wherein
   x is between about 0.05 and about 0.95,
   y is between about 0 and about 0.05,
   z is between about 0 and about 0.15, and
   w is between 0 to 0.10.

7. The electro-optic device of claim 6 wherein the electro-optic device is selected from the group consisting of an intensity controller, a phase controller and a polarization controller.

8. An optical lossless device comprising
   a transparent electro-optic gain ceramic material including
      lead,
      zirconium,
      titanium,
      erbium, and
      ytterbium; and
   an optical pumping source has a wavelength in the range of 880 nm to 1020 nm;
   wherein the transparent electro-optic gain ceramic material comprises the formula $$Pb_{1-z}La_z[Er_yYb_w(Zr_xTi_{1-x})_{1-3(y+w)/4-z/4}]O_3$$

wherein
   x is between about 0.05 and about 0.95,
   y is between about 0 and about 0.05,
   z is between about 0 and about 0.15, and
   w is between 0 to 0.10.

9. The optical lossless device of claim 8 further comprising an electric control circuit wherein the properties of the input light signal is manipulated by a control voltage.

* * * * *